United States Patent [19]

Krieg

[11] Patent Number: 5,000,283

[45] Date of Patent: Mar. 19, 1991

[54] FRONT SEAT ARANGED IN A TWO-DOOR MOTOR VEHICLE

[75] Inventor: Karl-Heinz Krieg, Ebersbach, Fed. Rep. of Germany

[73] Assignee: Daimler-Benz AG, Fed. Rep. of Germany

[21] Appl. No.: 486,369

[22] Filed: Feb. 28, 1990

[30] Foreign Application Priority Data

Mar. 4, 1989 [DE] Fed. Rep. of Germany ....... 3907075

[51] Int. Cl.$^5$ .......................... B60N 1/02; B60N 2/42; B60R 21/00
[52] U.S. Cl. ..................................... 180/271; 296/68; 296/68.1; 297/379
[58] Field of Search ............... 180/271, 290, 268, 282; 297/216, 353, 354, 379; 296/68, 65.1, 68.1

[56] References Cited

U.S. PATENT DOCUMENTS

| | | | |
|---|---|---|---|
| 2,945,722 | 7/1960 | Horton | 296/68.1 |
| 3,387,885 | 6/1968 | Boschen et al. | 296/68 |
| 3,817,571 | 6/1974 | Horvat et al. | 296/68.1 |
| 4,707,010 | 11/1987 | Groft et al. | 297/216 |
| 4,795,213 | 1/1989 | Bell | 297/379 |
| 4,904,003 | 2/1990 | Yamazaki et al. | 297/379 |
| 4,909,571 | 3/1990 | Vidwans et al. | 297/216 |

FOREIGN PATENT DOCUMENTS

| | | |
|---|---|---|
| 2360627 | 6/1974 | Fed. Rep. of Germany . |
| 2926800 | 2/1981 | Fed. Rep. of Germany . |
| 3046888 | 7/1982 | Fed. Rep. of Germany . |
| 3506540 | 8/1986 | Fed. Rep. of Germany . |

Primary Examiner—Richard A. Bertsch
Attorney, Agent, or Firm—Evenson, Wands, Edwards, Lenahan & McKeown

[57] ABSTRACT

An adjustable front seat is arranged in a two-door motor vehicle and has a backrest capable of forward-tilting and inclination-adjusting about the same axis. A locking of the backrest with a catch pin is caused by a fork latch, the locking of which is cancelled as a result of a pivoting of a spring-loaded detent pawl. Under adverse preconditions, a secure locking of the backrest can be provided if, when the locking position is reached, the detent pawl falls into the fork latch and the detent pawl interacts with a switch member. When the detent pawl has not properly engaged the fork latch this generates a signal, which, with the associated door closed and the ignition key inserted, activates a backrest-pivoting device for pivoting the backrest forwards while the momentary backrest inclination position is maintained, to pivot the fork latch (supported against the catch pin) about the latter until the detent pawl falls into the fork latch. The signal is cancelled when the detent properly engages into the fork latch.

3 Claims, 2 Drawing Sheets

FRONT SEAT ARANGED IN A TWO-DOOR MOTOR VEHICLE

BACKGROUND AND SUMMARY OF THE INVENTION

The invention relates to an adjustable front seat arranged in a two-door motor vehicle and having a backrest which has a forward-tilting and an inclination-adjusting movement that takes place about a single axis. Locking of the backrest is brought about by means of a fork latch engaging a catch pin. The locking of the backrest is cancelled by pivoting a spring-loaded detent pawl away from the fork latch.

A backrest which can be pivoted in this general way and which is secured in its position of use is known from German Offenlegungsschrift 2,360,627. This structure gives no guarantee that after a forward-pivoting seat operation, the backrest will be secured once again in its position of use. Non-securing can easily occur when the backrest is not pivoted back completely, or before reaching its rear position, it comes to bear against an obstruction (for example, against a luggage item placed on the rear seats). In the event of a sharp deceleration of the vehicle, an unsecured backrest, which can also be subjected to stress by a passenger sitting behind it, would then exert a load on the back of the seat user. This is especially serious if the backrest receives the upper belt articulation or belt deflection point of a seat belt system.

The object of the instant invention is to effectively prevent the backrest from moving towards the seat user under load, even before the motoring trip begins and even when the backrest cannot return into its secured position of use because of an obstacle.

The invention provides that in an adjustable front seat arranged in a two-door motor vehicle that has a backrest capable of forward-tilting and inclination-adjusting movements about a single axis, locking of the backrest occurs by means of a fork latch engaging with a catch pin and locking is cancelled by the pivoting of a spring-loaded detent pawl away from the fork latch. When a locking position is reached, the detent pawl falls into the fork latch and the detent pawl interacts with a switch member so that when the detent pawl has not fallen in to the fork latch, the switch which, with an associated door closed and an ignition key inserted, activates a backrest-pivoting device to pivot the backrest forwards while the momentary backrest inclination is maintained. Such pivoting of the backrest causes fork latch, which is supported against the catch pin, to pivot about the pin until the detent pawl falls into the fork latch, and the signal is thus stopped.

In seats employed with an integrated belt system it is desirable if there are two backrest-locking mechanisms, located opposite one another at the sides of the seat. Here, when the locking position is reached, each detent pawl falls into its associated fork latch and each detent pawl interacts with its switch member (when the detent pawl has not fallen into its fork latch) to generate a signal which, with the associated door closed and the ignition key inserted, triggers a visual and/or acoustic alarm. When two signals occur as a result of neither detent pawl engaging its respective fork latch, the backrest-pivoting device is activated for effecting pivoting the backrest forwards, while the momentary backrest inclination is maintained, to pivots the fork latches, which are supported against the respective associated catch pins, about their catch pin until at least one of the detent pawls falls into the fork latch. Then one of the signals stops.

Although it is already known from German Offenlegungsschrift 2,926,800 to indicate the incorrect engagement of a backrest-locking device, nevertheless measures for obtaining a secured position of use automatically are not provided.

Since, when two backrest-locking mechanisms are used, it is never possible to ensure completely that both detent pawls fall into their fork latches simultaneously and actuate the associated switch member simultaneously, after one signal has stopped, the fork latches are pivoted further through an additional short predetermined period of time.

Other objects, advantages and novel features of the present invention will become apparent from the following detailed description of the invention when considered in conjunction with the accompanying drawings.

DETAILED DESCRIPTION OF THE DRAWINGS

Figure 1:
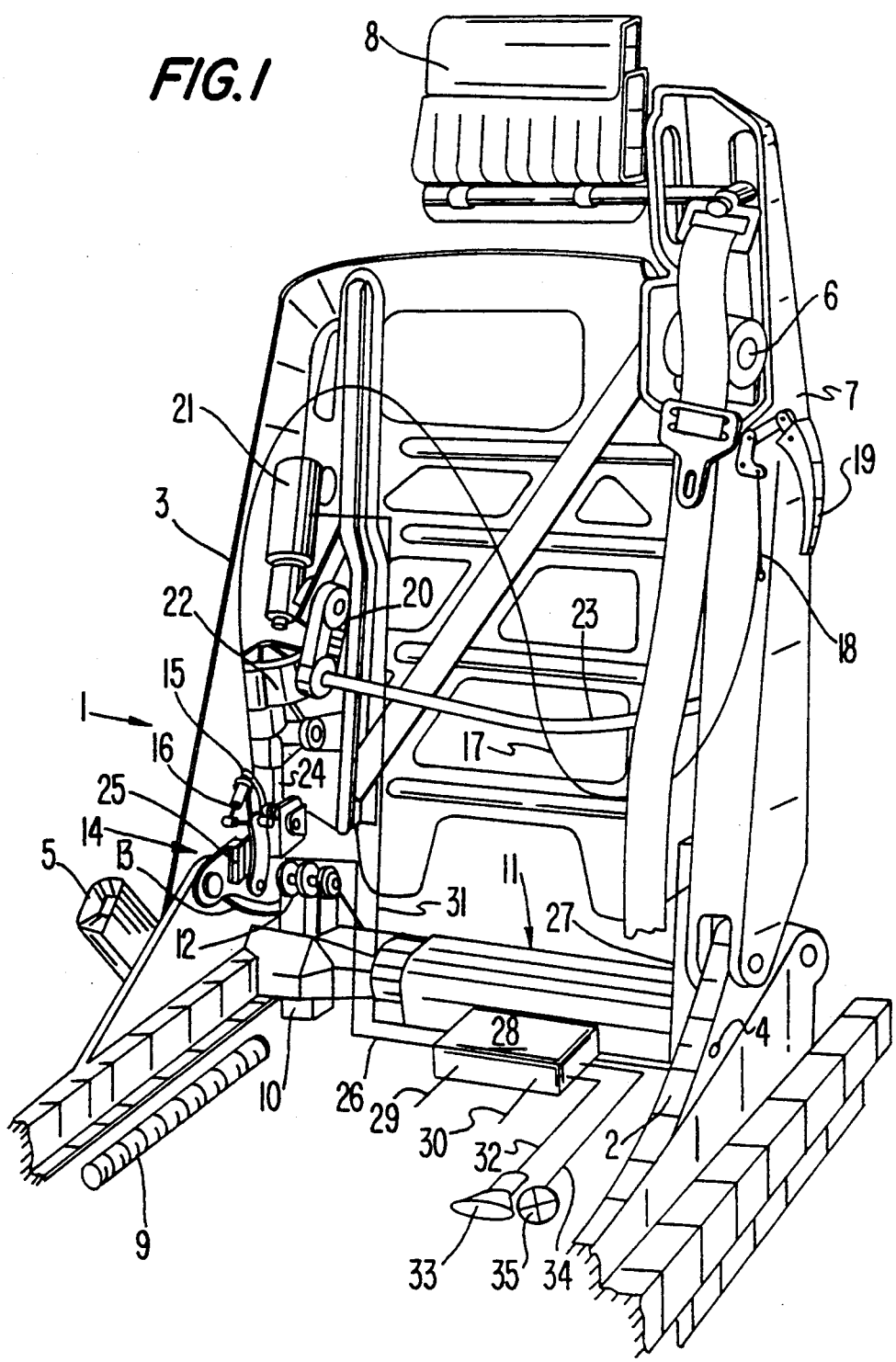
FIG. 1 shows a seat frame with a backrest-pivoting and locking mechanism.

In the front seat 1 illustrated in FIG. 1, part of the seat-cushion frame 2 and the backrest frame 3 can be seen. The lower lap seat-belt fastening point 4 and the lap seat-belt lock 5 are received by the seat-cushion frame 2. The belt-reeling device 6 of the shoulder belt of the three-point belt system is arranged in a profiled upward-projecting bearer 7 which forms an integral part of the backrest frame 3 at its upper end adjacent vertically displacable headrest carrier 8. The displacably headrest carrier 8 carries an upper support for shoulder-belt.

In addition to adjusting devices (not shown) for raising the front side of the seat cushion, there is also a longitudinal-adjustment device on the seat-cushion frame of which an adjusting spindle 9 is indicated. Furthermore there is a rear inclination-adjusting device 11 on the seat-cushion frame 2 which acts on two setting elements 10 (only one of which is partially visible) for simultaneously causing a change of height when the front inclination-adjusting device (not shown) is actuated. The non-shown setting element 10 appears hidden in FIG. 1 and is located on the opposite latch side of the seat in a complimentary manner. Each setting element 10 engages at its top on a catch pin 12 which is connected to the seat-cushion frame 2. When the backrest frame 3 is in a position of use, a fork latch 13 of a backrest-locking mechanism 14 locking engages pin 12. Likewise when the backrest frame 3 is in its position of use, a detent pawl 16 loaded by spring 15, falls into the fork latch 13. The detent pawl 16 can be released by a remote actuation means 17 which, together with a further remote actuation means 18 assigned to the detent pawl of a duplicate other side locking mechanism (not shown), leads to a release lever 19 attached to the bearer 7.

A backrest-pivoting device 20 is secured to the backrest frame 3 and consists of a drive motor 21, the rotational movement of which is transmitted to a variable gear 22 and via a flexible shaft 23 to a further variable gear, covered by the bearer 7 and assigned to second backrest-locking mechanism on the opposite lateral side of the seat. An adjusting rod 24 projects from the variable gear 22, held on the backrest frame 3, and is articulated on the backrest-locking mechanism 14.

Assigned to each detent pawl 16 is a switch member 25 which is designed as a limit switch and which has its contact closed when the detent pawl 16 has fallen correctly into the fork latch 13. A first electric wire line set 26 leads from the visible switch member 25 and a second line set 27 from a switch member on the opposite side to a central control unit 28. Further center control unit 28 wire inputs are designated by 29 and 30 and they lead from an ignition lock and a door-contact switch of the associated door. Wire output 31 from the center control 28 serves for activating the drive motor 21. There is also a buzzer 33 connect, activated by a wire line 32 connected to the central control 28 as well as a warning light 35 connected via a wire line 34.

Figure 2:
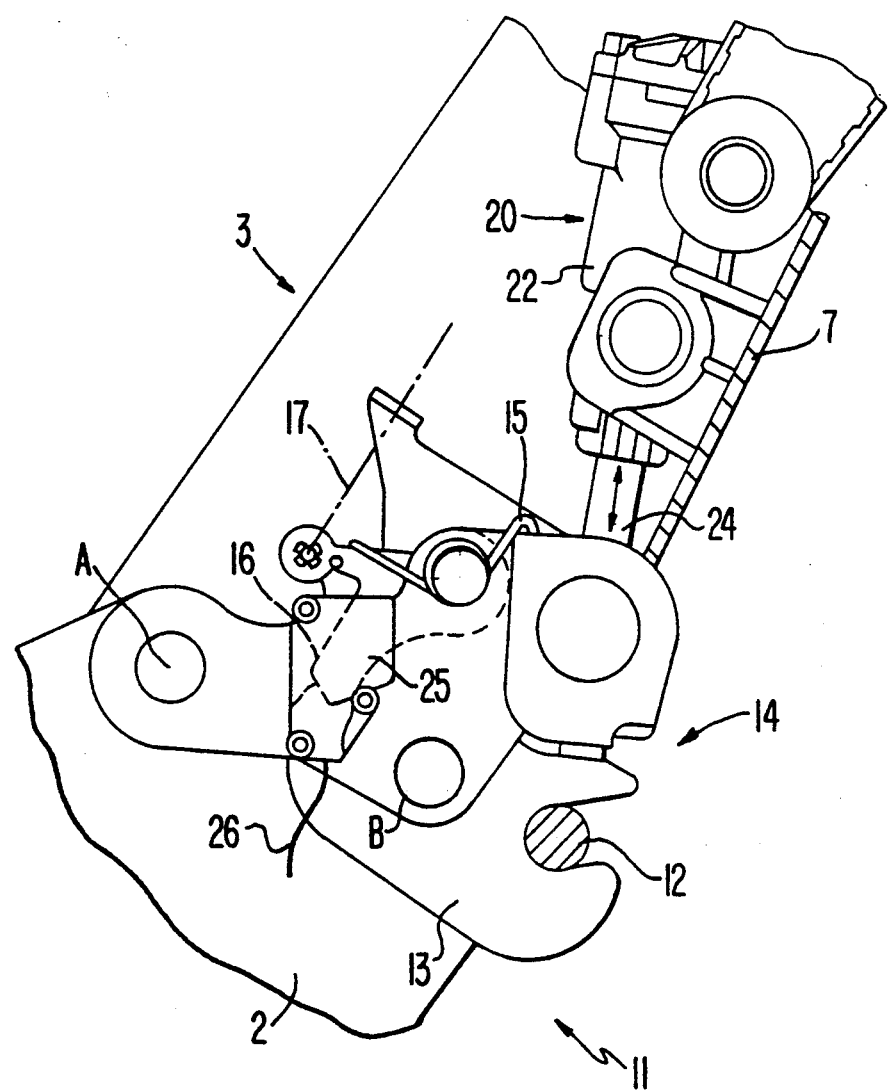
FIG. 2 shows the backrest-pivoting and locking mechanism in the locked state and on a larger scale taken from the vehicle drivers side.

When the backrest frame and its backrest (not shown) are to be tilted forwards out of the locked position shown in FIG. 2, the detent pawl 16 is pivoted by the remote actuation means 17 in the clockwise direction counter to the force of the spring 15. The detent 16 thus comes out of engagement with the fork latch 13. Each of the switch members 25 thereby responds. However, since unlocking is carried out only when the door is open, an associated door-contact switch is opened to provide an input to the central control 28 so that neither the buzzer 33 nor the warning light 35 (FIG. 1) responds. There is, also no permissible activation of the drive motor 21 as switch 25 is open. Since the fork latch 13 is free, the backrest frame 3 can pivot about the axis designated "A" in FIG. 2. At the same time, the fork latch 13 executes a pivoting movement which is caused by the catch pin 12 and which, when the backrest frame 3 is pivoted back, allows the fork latch 13 to engage over the catch pin 12 again.

If the backrest frame 3 is not pivoted back properly, with the result that the detent pawl 16 does not fall into the fork latch 13 on the two locking 15 mechanisms 14 located opposite one another, at least one of the two switch members 25 will continue to remain open. If the associated vehicle door is closed and the ignition key inserted, in the above-described initial position, both the buzzer 33 and the warning light 35 are actuated. In addition, the backrest-pivoting device 20 is activated with the effect of a forward pivoting to extend adjusting rod 24. Without the inclination of the backrest frame 3 changing, the fork latch 13, supported against the catch pin 12, pivots in the counter-clockwise direction (about the axis designated by "B" in FIG. 2), until the detent pawl 16 falls into stops latch 13. Then the signal of the associated switch member 25 stops. When two backrest-locking mechanisms 14 are used and because of the tolerances that occur, it is never possible to ensure that the two detent pawls 16 will fall into the latch 13 simultaneously to actuate their associated switch member 25. Accordingly at the response of one switch member 25, the backrest-pivoting device 20 still remains switched on for approximately one second. Should locking occur on only one side despite this time lag of limited time duration, the actuation of the backrest-pivoting device 20 is cut off. In such an instance, however, at least the warning light 35 signals the failure to lock, or of a fault in the electrical transmission path. Thus a warning that this fault should be investigated as quickly as possible is provided.

Starting from the locked position of the backrest-locking mechanism 14, it is possible to pivot the backrest 3 forwards or rearwards by an appropriate switch-actuated activation of the backrest-pivoting device 20, the pivoting movement taking place about the axis "A" (FIG. 1). During forward pivoting, the adjusting rod 24 is extended and during backward pivoting it is retracted.

Since there is also the possibility of a failure of the door-contact switch, contrary to the operating mode described above, the warning light 35 can be activated directly by the switch member 25. This will provide a first warning threshold when the backrest locking mechanism 14 is released and the ignition switched on. Since here the warning light 35 lights up even with the door open. An acoustic warning via the buzzer 33 can then additionally occur when the door and therefore also the associated door-contact switch are closed. A second warning threshold is obtained thereby.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed

1. An adjustable front seat for a two-door motor vehicle that has a back rest which has a forward-tilting and an inclination-adjusting movement that takes place about a single axis;
   wherein locking of the backrest is obtained by a catch pin being engaged by a fork latch;
   wherein the locking is cancelled as a result of pivoting away of a spring-loaded detent pawl from the fork latch;
   wherein, when a locking position is reached, the spring loaded detent pawl falls into the fork latch;
   wherein, when a locking position is reached, the spring loaded detent pawl interacts with a switch member to generates a signal when the detent pawl has not fallen into the fork latch;
   wherein when an associated vehicle door is closed and when an ignition key is inserted into an ignition switch, the signal activates a backrest-pivoting means for pivoting the backrest forward while the momentary backrest inclination movement position is maintained;
   wherein the backrest pivoting causes the fork latch, which is supported against the catch pin, to pivot about the catch pin until the detent pawl falls into the fork latch; and
   wherein the detent pawl falling into the fork latch causes the signal to stop.

2. An adjustable front seat for a two-door motor vehicle that has a back rest which has a forward-tilting and an inclination-adjusting movement that takes place about a single axis;
   wherein locking of the backrest is obtained by a catch pin being engaged by a fork latch;
   wherein the locking is cancelled as a result of pivoting away of a spring-loaded detent pawl from the fork latch;
   wherein, when a locking position is reached, the spring loaded detent pawl falls into the fork latch;

wherein there are two backrest-locking mechanisms located opposite one another on opposite sides of the seat;

wherein when the locking position is reached, the detent pawl of each backrest locking mechanism falls into an associated fork latch;

wherein each detent pawl interacts with a switch member to generate a signal when a respective detent pawl has not fallen in to its respective fork latch and two signals when both detent pawls have not fallen into their respective fork latches;

wherein when an associated door is closed and when an ignition key is inserted into an ignition switch, a signal will trigger at least one of a visual and acoustic alarm;

wherein when two signals occur, the signals active a backrest-pivoting means for effecting pivoting of the backrest forwards while the momentary backrest movement inclination is maintained;

wherein the backrest pivoting causes the fork latches, which are supported against a respective catch pin, to pivot about the catch pin until at least one of the detent pawls falls into its fork latch; and wherein the falling in of one detent pawl into its associated fork latch causes its signal to stop.

3. A front seat according to claim 2, wherein after one signal has lapsed, the fork latches are pivoted further for an additional short predetermined period of time.

* * * * *